INVENTOR.
HOWARD T. WHITE
BY
ATTORNEY

March 10, 1964 H. T. WHITE 3,124,077
MOTOR DRIVEN PUMPS
Filed Jan. 5, 1962 2 Sheets-Sheet 2
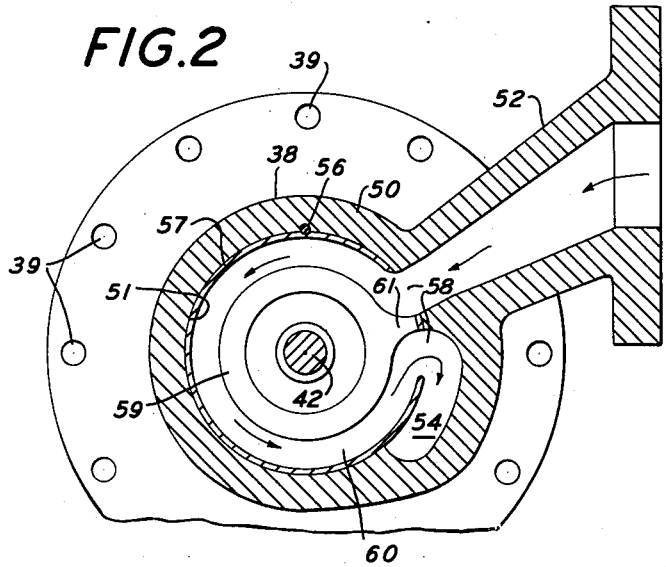
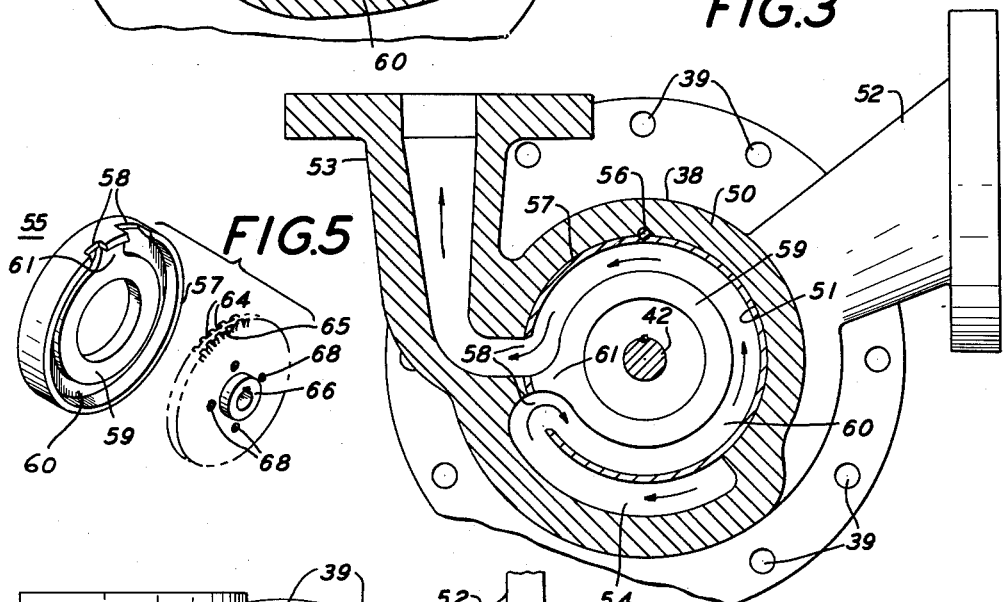
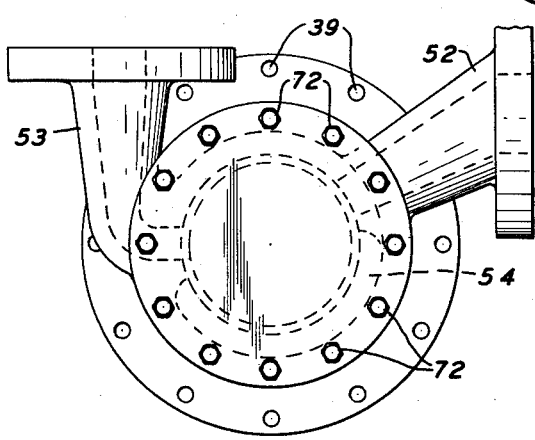
INVENTOR.
HOWARD T. WHITE 3,124,077
MOTOR DRIVEN PUMPS
Howard T. White, Melrose Park, Pa., assignor to Fostoria Corporation, Huntingdon Valley, Pa., a corporation of Ohio
Filed Jan. 5, 1962, Ser. No. 164,466
6 Claims. (Cl. 103—87)

This invention relates to motor driven pumps and more particularly to an improved rotor and stator construction for multi-stage pumps.

It is the principal object of the present invention to provide a motor driven pump having a plurality of stages in which the construction is simple but effective for accomplishing the desired pumping operation.

It is a further object of the present invention to provide a multi-stage motor driven pump in which a portion of the fluid being pumped is circulated for cooling the motor.

It is a further object of the present invention to provide a multi-stage motor driven pump in which the pump housing is formed in a simple but effective manner with inlet, outlet and transfer connections, and with inserted pump stator units for guiding and directing fluid flow.

It is a further object of the present invention to provide a multi-stage motor driven pump in which the pump impeller assembly and the fluid guiding stator units within the pump housing can be quickly and easily assembled for initial assembly, and disassembled for inspection and for replacement.

It is a further object of the present invention to provide a multi-stage motor driven pump which does not require any packing glands or the like.

Other objects and advantageous features of the invention will be apparent from the description and claims.

The nature and characteristic features of the invention will be more readily understood from the following description, taken in connection with the accompanying drawings forming part thereof, in which:

FIG. 2 is a transverse sectional view taken approximately on the line 2—2 of FIG. 1;

FIG. 3 is a transverse sectional view taken approximately on the line 3—3 of FIG. 1;

FIG. 4 is an end elevational view as seen from the right of FIG. 1; and

FIG. 5 is an exploded perspective view of one of the stator inserts and impellers.

Figure 1:
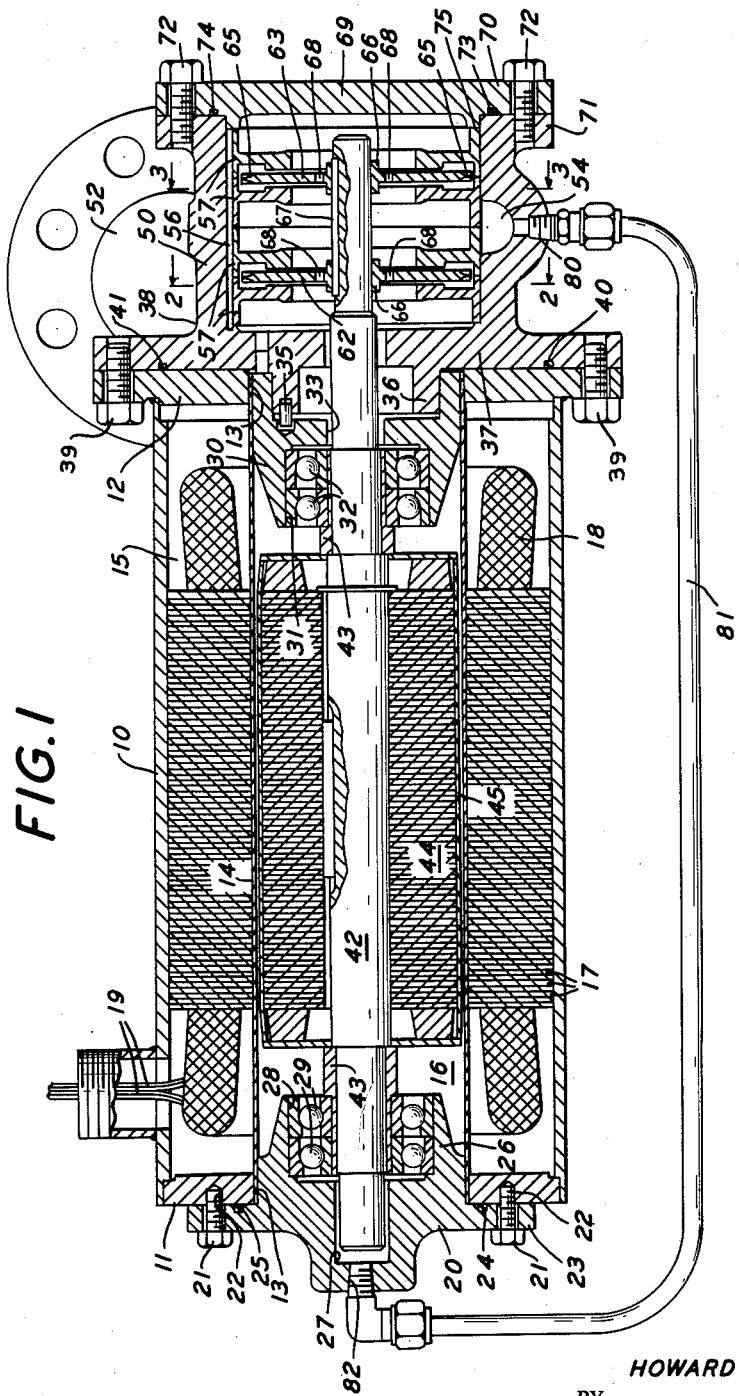
FIGURE 1 is a vertical central sectional view of a motor driven pump in accordance with the present invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, the motor driven pump therein illustrated preferably includes a motor housing 10 of generally hollow cylindrical shape having end closure plates 11 and 12 secured thereto in any desired manner, such as by welding. The end plates 11 and 12 have central openings 13 for the reception of a cylindrical sleeve 14 which is preferably of non-corrosive non-magnetic material secured to the end plates 11 and 12 in any desired manner, such as by welding. An isolated motor stator chamber 15 is thus provided within the space bounded by the motor housing 10, the sleeve 14 and the end plates 11 and 12. The interior of the sleeve 14 provides a motor rotor chamber 16.

Within the motor stator chamber 15, motor stator laminations 17 and the motor stator windings 18 are provided with conductors 19 extending from the windings 18 to any suitable source of electrical energy and preferably a source of alternating current.

A rotor chamber end closure plate 20 is provided secured to the end plate 11 in any desired manner, such as by bolts 21 which extend into blind holes 22 in the end plate 11. The end closure plate 20 has a flange portion 23 with an annular groove 24 for the reception of a packing 25, such as an O-ring, for preventing fluid leakage at this location. The end closure plate 20 has an inwardly extending hub portion 26 with an end bore 27 and with an interior bore 28 for reception of bearings 29 of any desired type, such as ball bearings.

At the opposite end of the sleeve 14, a hub 30 is provided within the sleeve 14, and has a bore 31 for the reception of bearings 32 of any preferred type, such as ball bearings, and a central opening 33.

The hub 30 is preferably held in position by one or more locking pins 35 carried by an annular extension 36 of an end closure plate 37 forming part of the pump housing 38. The end closure plate 37 is secured to the end plate 12 in any desired manner, such as by bolts 39.

The end closure plate 37 can be provided with an annular groove 40 for the reception of a packing 41, such as an O-ring, for preventing fluid leakage at this location.

A shaft 42 is provided having shaft sleeves 43 thereon received in the bearings 29 and 32, and between and positioned by the sleeves 43 has a motor rotor 44, preferably of the short circuited type, keyed thereto and enclosed within an enclosing casing 45 for preventing access of fluid in the motor rotor chamber 16 to the laminations of the motor rotor 44.

The pump housing 38 has a cylindrical section 50 extending longitudinally axially with an interior cylindrical longitudinally axially extending face 51. A fluid inlet connection 52 extends to the face 51 at a predetermined angular and longitudinal axial location as will be seen in FIGS. 2, 3 and 4.

A fluid delivery connection 53 extends from the face 51 at a predetermined angular and longitudinal axial location as will also be seen in FIGS. 2, 3 and 4.

A fluid transfer passageway 54, cored along the surface 51, extends from a location in angularly spaced relation to the fluid inlet connection 52 to a location in angularly spaced relation to the fluid delivery connection 53 thereby providing a connection between the first and second stages of the pump as hereinafter more fully explained.

In order to provide in the interior of the cylindrical section 50 the plurality of stages, inserted pump stator units 55 are provided, two facing units 55 preferably being employed for each stage. The units 55 are preferably held in oriented and assembled relation, and restrained from rotation, by a pin 56 which extends longitudinally along the surface 51.

One of the pump stator units 55 is shown in detail in FIG. 5 and as illustrated each unit 55 has a rim 57 with spaced openings 58 for establishing communication with the fluid inlet connection 52 and passageway 54 in one stage of the pump and between the passageway 54 and the fluid delivery connection 53 in the other stage of the pump.

Each of the pump stator units 55, bounded by the rim 57 and by an inner ring 59 has an annular fluid pumping chamber 60. The chamber 60 is interrupted, between the openings 58 by an abutment 61 which thus separates the inlet and outlet connections.

Impellers 62 and 63 are provided for each of the pairs of stator units 55, the impellers 62 and 63 each comprising a circular plate with alternating slots 64 having curved roots 65 on opposite faces extending outwardly to the periphery. The impellers 62 and 63 each have hubs 66 which are slidable along the shaft 42 but are held against rotation on the shaft 42 by a key 67 and have a plurality of openings 68 therethrough for fluid flow.

The outer end of the pump housing 38 is closed by a housing closure plate 69 having a flange 70 which is secured to a flange 71 on the housing 38 by bolts 72. An annular groove 73 in the plate 69 can have a packing 74, such as an O-ring, therein for preventing fluid leakage at this location.

The plate 69 has an internal rim 75 for preventing axial movement of the stator units 55 in the housing 38.

The passageway 54 preferably has a fluid connection 80 connected thereto, for the delivery of the fluid under pressure through a pipe 81 to a port 82 in the end closure plate 20, for supplying fluid for circulation through the bearings 29 to the motor rotor chamber 16, then along the exterior of the motor rotor 44 and through the bearings 32 and back to the interior of the housing 38. Fluid in contact with the impellers 62 and 63 tends to become impelled outwardly into the fluid pumping chambers 60 by centrifugal action.

The mode of operation will now be pointed out.

The windings 18 of the motor stator are energized by the conductors 19, which are connected to a suitable alternating current source, and establish a rotating field which is effective for rotating the motor rotor 44 and the shaft 42 upon which the motor rotor 44 is mounted.

Upon rotation of the shaft 42 the impellers 62 and 63 are rotated in the space between the rings 59 of the stator units 55. Fluid entering the fluid inlet connection 52 passes through openings 58 to the impeller chambers 60 for the impeller 62. Upon rotation of the impeller 62 fluid is impelled by slots 64, strikes the interior walls of the impeller chambers 60 on each side and is directed for entry and re-entry, a plurality of times into and from the slots 64 between its entrance through the inlet connection 52 and one of the radial openings 58 and its discharge through the other of the openings 58.

As the fluid is thus repeatedly picked up and impelled outwardly, additional velocity is imparted thereto, the fluid being moved in a general spiral path within the spaces in the impeller chambers 60. The fluid is thus advanced for delivery through the other of the radial openings 58 and the fluid transfer passageway 54 and enters at the radial opening 58 for the next stage. The fluid thus made available in the impeller chambers 60 of the second stage is impelled as before and delivered with entry and re-entry into the slots 54 for delivery through the other of the radial openings 58 for the second stage and to the fluid delivery connection 53.

The action of the fluid on the opposite faces of the impeller plates 62 and 63 provides a pressure balance which tends to position each of the impellers 62 and 63 with substantially equal clearance on each side between the impeller plates 62 and 63 and the rim portions 59.

A portion of the fluid from the passageway 54 is delivered through the pipe 81 and to the port 82 in the end closure plate 20 and moves, as previously pointed out, through the bearings 29 at the left in FIG. 1, and then through the clearance space between the periphery of the motor rotor 44 and the interior of the sleeve 14 and through the bearings 29 at the right of FIG. 1 for return and passage outwardly impelled by the centrifugal action of the impeller plates 62 and 63. The fluid thus provided serves to lubricate the bearings 29 and at the same time cool the motor rotor 44.

The stator units 55, in pairs, and with one pair for each stage, can be readily inserted into the cylindrical section 50, engaging the face 51 with the impeller plates 62 and 63 interposed and slidable along the key 67 on the shaft 42. The stator units 55 are oriented by the pin 56 so that their openings 58 are at the proper locations for fluid inlet and discharge. The stator units 55 are held against endwise movement by their engagement and the engagement of the rim 73 with the rim 57 of the outermost stator unit 55.

I claim:

1. A motor driven pump having a pump housing, end closures for the opposite ends of said pump housing, a shaft in said pump housing, said pump housing having a hollow cylindrical portion with an interior longitudinally axially elongated cylindrical face and fluid inlet and delivery connections extending to said interior face at longitudinally axially spaced locations along said face, said pump housing having a fluid transfer passageway intermediate said connections, said fluid transfer passageway comprising a groove along said face extending peripherally and longitudinally, a plurality of pump stator units in facing pairs mounted in said hollow cylindrical portion, said units each having outer annular rim portions engaged with said interior face, said rim portions each having circumferentially spaced inlet and outlet openings communicating respectively with said fluid inlet connection and said fluid transfer connection and with said fluid transfer connection and said fluid delivery connection, said units each having an annular fluid pumping space inwardly of and bounded by its rim portion, said rim portions providing a boundary wall for said fluid transfer passageway between an outlet and inlet opening, and fluid impeller members in each of said pairs of units keyed to said shaft for rotation therewith.

2. A motor driven pump as defined in claim 1 in which said pump housing has an interiorly disposed longitudinally extending orienting member for said pump stator units in engagement with said rim portions.

3. A motor driven pump as defined in claim 1 in which said transfer passageway has a cooling fluid connection extending therefrom.

4. A motor driven pump having a pump housing, end closures for the opposite ends of said pump housing, a shaft extending into said pump housing, said pump housing having a hollow cylindrical portion with an interior longitudinally axially elongated cylindrical face and fluid inlet and delivery connections extending to said interior face at longitudinally axially spaced locations along said face, said pump housing having a fluid transfer passageway interposed between said connections, said fluid transfer passageway comprising a groove along said face extending peripherally and longitudinally, a plurality of pump stator units in facing pairs, each of said stator units having an outer annular rim in peripheral engagement with said interior face and an inner ring portion spaced inwardly from said rim, and an abutment extending between said ring and said rim and defining with said ring and said rim a fluid pumping chamber inwardly disposed with respect to said outer annular rim, said rims having circumferentially spaced inlet and outlet openings communicating with said fluid pumping chamber on opposite sides of said abutment, the inlet openings of said pairs being respectively in communication with said fluid inlet connection and said fluid transfer connection and the outlet openings of said pairs being respectively in communication with said transfer connection and said fluid delivery connection, said rim portions providing a boundary wall for said fluid transfer passageway between an outlet and an inlet opening, and fluid impeller plates in each of said pairs of units keyed to said shaft for rotation therewith and longitudinal positioning therealong.

5. A motor driven pump as defined in claim 4 in which said pump housing face has an orienting member extending therealong for said pump stator units in engagement with said rim portions.

6. A motor driven pump as defined in claim 4 in which said transfer passageway has a cooling fluid connection extending therefrom.

(References on following page)

References Cited in the file of this patent

UNITED STATES PATENTS

| | | |
|---|---|---|
| 782,273 | Ray | Feb. 14, 1905 |
| 1,080,655 | Richardson | Dec. 9, 1913 |
| 2,056,533 | Abramson | Oct. 6, 1936 |
| 2,258,416 | Leopold et al. | Oct. 7, 1941 |
| 2,574,724 | Baker | Nov. 13, 1951 |
| 2,810,348 | White | Oct. 22, 1957 |
| 2,963,980 | White | Dec. 13, 1960 |

FOREIGN PATENTS

| | | |
|---|---|---|
| 2,223 | Great Britain | July 28, 1911 |